United States Patent
Hamernik

(10) Patent No.: US 8,777,241 B1
(45) Date of Patent: Jul. 15, 2014

(54) SUSPENSION COMPONENT WITH TAPERED SPINDLE JOINT

(71) Applicant: Ford Global Technologies, LLC, Dearborn, MI (US)

(72) Inventor: David Hamernik, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/789,790

(22) Filed: Mar. 8, 2013

(51) Int. Cl.
*B62D 7/18* (2006.01)

(52) U.S. Cl.
CPC .............. *B62D 7/18* (2013.01); *B60G 2200/44* (2013.01); *B60G 2206/50* (2013.01)
USPC .................................................... 280/93.512

(58) Field of Classification Search
CPC .. B62D 7/18; B60G 2206/50; B60G 2200/44; B60G 2204/148
USPC .................................................... 280/93.512
See application file for complete search history.

(56) References Cited

U.S. PATENT DOCUMENTS

| | | | | |
|---|---|---|---|---|
| 1,611,453 A | * | 12/1926 | Johnson .................... | 280/93.512 |
| 2,375,167 A | * | 5/1945 | Frudden .................... | 280/93.505 |
| 3,563,564 A | * | 2/1971 | Bartkowiak .............. | 280/93.512 |
| 3,852,872 A | * | 12/1974 | Afanador et al. .............. | 29/447 |
| 3,889,512 A | * | 6/1975 | Delio .............................. | 72/377 |
| 3,908,480 A | * | 9/1975 | Afanador et al. ............ | 74/511 R |
| 4,002,286 A | * | 1/1977 | Simon ........................... | 228/174 |
| 4,392,293 A | * | 7/1983 | Yamaguchi et al. ............. | 29/436 |
| 4,600,205 A | * | 7/1986 | Stewart et al. ........... | 280/86.758 |
| 4,722,540 A | * | 2/1988 | Kozyra et al. .......... | 280/124.136 |
| 4,974,989 A | * | 12/1990 | Salter ......................... | 403/408.1 |
| 5,868,409 A | | 2/1999 | Breuer | |
| 6,217,046 B1 | * | 4/2001 | Bodin et al. ............. | 280/93.512 |
| 6,276,702 B1 | * | 8/2001 | Turck et al. .............. | 280/93.511 |
| 6,565,159 B1 | * | 5/2003 | Kosak ........................... | 301/132 |
| 6,616,156 B1 | | 9/2003 | Dudding et al. | |
| 6,641,229 B1 | * | 11/2003 | Kosak .......................... | 301/132 |
| 6,916,030 B2 | * | 7/2005 | Cai .......................... | 280/93.512 |
| 7,506,883 B2 | * | 3/2009 | Downs et al. .......... | 280/124.134 |
| 7,530,583 B2 | * | 5/2009 | Gottschalk ............... | 280/93.512 |
| 7,815,203 B2 | * | 10/2010 | Adleman et al. ......... | 280/93.512 |
| 7,832,073 B2 | * | 11/2010 | Ebert ......................... | 29/402.06 |
| 8,047,740 B2 | * | 11/2011 | Christ ......................... | 403/270 |
| 8,205,896 B2 | * | 6/2012 | Gell et al. ................ | 280/93.512 |
| 8,469,378 B1 | * | 6/2013 | Bodary et al. ........... | 280/93.512 |
| 2003/0098563 A1 | * | 5/2003 | Hacker .................... | 280/93.512 |

(Continued)

FOREIGN PATENT DOCUMENTS

DE          41 41 266 A1      6/1993

*Primary Examiner* — Nicole Verley
(74) *Attorney, Agent, or Firm* — Raymond L. Coppiellie; Brooks Kushman P.C.

(57) ABSTRACT

A suspension component assembly having a knuckle that attaches to the suspension system providing a generally vertical support from which a generally transverse cantilevered spindle may extend. The knuckle defines a tapered spindle-bore and the spindle has a tapered portion extending from a cantilever portion at least partially disposed within the tapered spindle-bore. The tapered portion of the knuckle disposed in the tapered spindle-bore provide a tapered joint which distributes the loads between the adjoining surfaces of the joint caused by the moment placed on the spindle by vehicle weight more effectively than a non-tapered spindle disposed in a non-tapered spindle-bore.

18 Claims, 2 Drawing Sheets

(56) References Cited

U.S. PATENT DOCUMENTS

| | | | |
|---|---|---|---|
| 2006/0237939 A1* | 10/2006 | Hicks | 280/124.116 |
| 2007/0001416 A1* | 1/2007 | Freytag et al. | 280/93.512 |
| 2007/0007740 A1* | 1/2007 | Downs et al. | 280/93.511 |
| 2008/0309042 A1* | 12/2008 | Gercke et al. | 280/93.512 |
| 2010/0025951 A1* | 2/2010 | Buchwald et al. | 280/93.512 |
| 2010/0038873 A1* | 2/2010 | Stoychey | 280/93.512 |
| 2010/0219598 A1* | 9/2010 | Ziech | 280/93.512 |
| 2014/0027994 A1* | 1/2014 | Varela et al. | 280/93.512 |

* cited by examiner

US 8,777,241 B1

SUSPENSION COMPONENT WITH TAPERED SPINDLE JOINT

TECHNICAL FIELD

This disclosure relates to an automotive suspension component having a non-driven spindle extending therefrom to support a rotating wheel, and specifically to the spindle and suspension component having a tapered joint between the two.

BACKGROUND

In automobiles, non-driven wheels are typically connected to the automobile's suspension system through a rotating member such as a hub-and-bearing assembly disposed on a free end of a non-rotating member such as a spindle.

Spindles have traditionally been connected to a suspension component, such as a knuckle, with the free end of the spindle extending outwardly from the suspension component. The vehicle's wheel and tire assemblies are connected to the spindle via a hub-and-bearing assembly. The weight of the vehicle places the joint of the spindle and knuckle under a moment. The moment causes fatigue on the knuckle near the inlet and outlet of the spindle-bore. Attempts have been made to combat this fatigue, including increasing the diameters of the spindle-bore and spindle to increase the contact surface between the components and disposing sleeves between the two components. As vehicle manufactures continue to increase durability requirements of vehicles while simultaneously decreasing the size and/or weight of their components, the fatigue on the knuckle becomes more difficult to manage.

The above problem(s) and other problems are addressed by this disclosure as summarized below.

SUMMARY

One aspect of this disclosure is directed to a steering-knuckle assembly with a tapered spindle-bore in the steering-knuckle and a tapered knuckle-mating portion of a spindle at least partially disposed within the spindle-bore. In use, the weight of a vehicle places the spindle under a moment within the spindle-bore. The taper of the knuckle-mating section and spindle-bore distributes the forces caused by the moment over the contacting surfaces and reduces the fatigue on the knuckle when compared to a non-tapered joint.

The spindle has a cantilevered end extending away from the knuckle-mating portion. The weight of the vehicle places a force on the cantilevered end which imparts the moment on the knuckle-mating portion disposed within the spindle-bore. In one embodiment, the knuckle-mating portion and spindle-bore taper inwardly toward the force on the cantilevered end.

According to another aspect of this disclosure, a suspension sub-assembly for a vehicle having a spindle with a tapered portion is pressed into a tapered spindle-bore of a suspension component. In this aspect, like others, the suspension component may or may not be a steerable suspension component. The spindle has a cantilever portion extending from the tapered portion and away from the suspension component. The tapered joint of the spindle in the suspension component reduce fatigue caused by the moment on the spindle within the knuckle as compared to a non-tapered joint.

According to a further aspect of this disclosure, an automotive knuckle assembly has a knuckle defining a spindle-bore therethough, and a spindle having a tapered knuckle-mating portion is disposed within the spindle-bore. In this aspect, the knuckle-mating portion of the spindle tapers inwardly from an inboard end to an outboard end.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
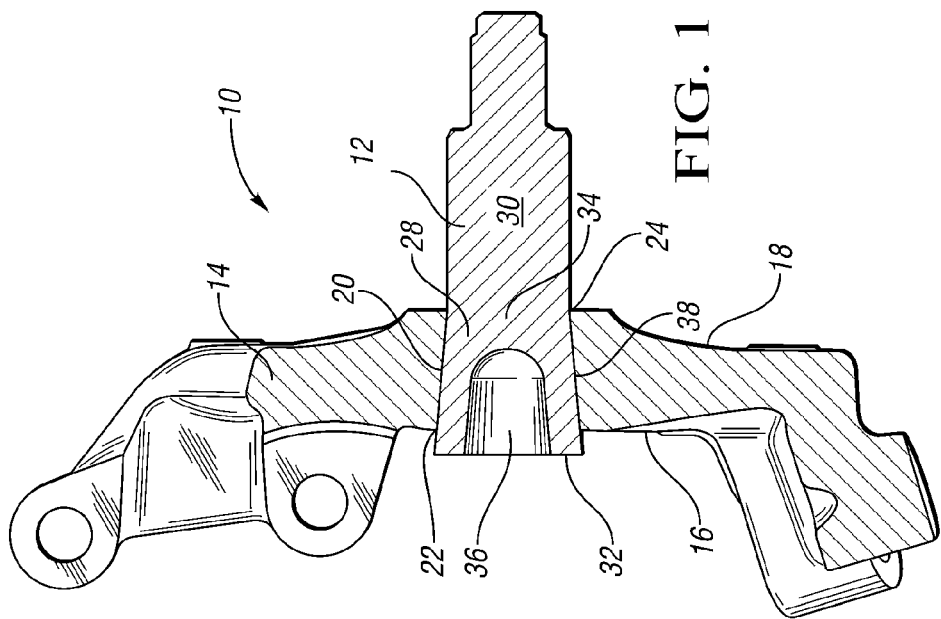
FIG. 1 is a cross-sectional view of a spindle having a tapered portion at least partially disposed in a tapered spindle-bore of a knuckle.

FIG. 1 shows a cross-sectional view of a vehicular suspension sub-assembly 10 comprising a spindle 12 at least partially disposed within a suspension component 14. In this figure, the suspension component 14 is shown as an automotive front steering-knuckle 14, however the knuckle 14 does not have to be a steerable suspension component. The suspension component 14 need only provide a generally vertical support from which a generally transverse cantilevered spindle 12 may extend.

The vertical and transverse orientations are in reference to vehicle position, and the term "generally" as applied to the orientations indicates that the components do not have to lie perfectly on the vertical or transverse axes. Components may differ from vertical and transverse orientations as the vehicle squats, as the vehicle is steered, as the vehicle moves over differing terrain and inclines allowing the suspension to travel from its upper most boundary to its lowest most boundary, which often causes the components to change in angular orientation relative to a longitudinal axis of the vehicle, as well as the potential ability to adjust the camber, toe, and/or caster of the suspension components on the vehicle.

The spindle 12 is shown as extending from the knuckle 14 in a generally orthogonal direction, although other orientations may be used. The spindle 12 is a non-driven component which is non-rotating relative to the suspension component from which it extends. The spindle 12 extends outboard from the knuckle 14 to allow a wheel and tire (not shown) to rotate about the spindle and be connected to the vehicle through the suspension sub-assembly 10 which is part of the vehicle suspension system. One example of a non-driven spindle is one which extends from a front steering-knuckle on a rear-wheel drive automobile. Another example of a non-driven spindle is one which extends from a rear axle suspension component, especially in the case of an independent rear suspension when a solid rear axle is not used, on a front wheel drive automobile.

The knuckle 14 has an inboard side 16 and an outboard side 18 relative to vehicle position. The knuckle 14 defines a spindle-bore 20 which extends through the knuckle 14 from the inboard side 16 to the outboard side 18. The spindle-bore 20 has an inboard opening 22 that opens on the inboard side 16, and an outboard opening 24 that opens on the outboard side 18. The spindle-bore 20 is tapered and is shown tapering inwardly from the inboard opening 22 to the outboard opening 24.

The spindle 12 has a knuckle-mating portion 28 partially disposed in the spindle-bore 20 and a cantilever portion 30 connected to and extending from the knuckle-mating portion 28 away from the outboard side 18 of the knuckle 14. The knuckle-mating portion 28 has an inboard end 32 and an outboard end 34. The knuckle-mating portion 28 is tapered corresponding to the tapered spindle-bore 20, inwardly from the inboard end 32 to the outboard end 34. The knuckle-mating portion 28 is shown defining a void 36 which may increase elasticity of the mating surface of the spindle 12 with the knuckle 14.

A portion of the tapered knuckle-mating portion 28 of the spindle 12 is disposed within the tapered spindle-bore 20 of the knuckle 14 to provide a tapered joint 38 between the two components. The inboard end 32 of the knuckle-mating portion 28 is shown extending out from the inboard opening 22 and not disposed within the spindle-bore 20, however, the inboard end 32 may be disposed within the spindle-bore 20 so long as the inboard end remains inboard from the outboard opening 24 of the spindle-bore 20. The outboard end 34 of the knuckle-mating portion 28 is shown disposed within the spindle-bore 20 at the outboard opening 24, however, the outboard end 34 may extend outward from and not be disposed within the spindle-bore 20. The spindle-bore 20 and the knuckle-mating portion 28 may have corresponding tapers which taper inwardly toward the cantilever portion 30 of the spindle 12.

The taper of the knuckle-mating portion 28 of the spindle 12 may correspond to the taper of the spindle-bore 20 of the knuckle 14 to provide a nested fit between the spindle 12 and the knuckle 14. A nested fit may be defined as a relationship between the two components in which one component restricts movement of the other in a respective direction. The spindle 12, while moving in an outboard direction, may pass through the inboard opening 22 of the tapered spindle-bore 20. The tapered knuckle-mating portion 28 may contact the tapered spindle-bore 20 hindering further movement of the spindle 12 in the outboard direction. The inboard end 32 of the knuckle-mating portion 28 is restricted from passing through the outboard opening 24 of the spindle-bore 20. The nested fit provides an outboard self-locking feature without need for elastic deformation of the materials or concern for surpassing material yield.

The tapered knuckle-mating portion 28 of the spindle 12 may, however, also be press-fit into the tapered spindle-bore 20 of the knuckle 14. A press-fit, also known as an interference fit or friction fit, is a fastening between two parts which is achieved by friction after the parts are pushed together, rather than by any other means of fastening. The friction that holds the components together is often greatly increased by compression of one component against the other, providing an elastic deformation of one or both of the components, which relies on the tensile and compressive strengths of the materials within the material yield. If material yield is surpassed in the press-fit or during use of the components on the vehicle, plastic deformation may occur loosening the joint. The tapered joint 38 provides additional robustness to moment loading during operation of the vehicle when compared to a non-tapered joint.

The knuckle 14 and spindle 12 may be manufactured from a variety of metals, alloys and composites using various forming processes. Non-limiting examples of materials used to manufacture the two components are aluminum, iron, steel and titanium. Non-limiting examples of forming processes used to manufacture the two components are casting, forging, extrusion, powder metallurgy and hydroforming. Forming processes may also include various forms of machining and hardening. The knuckle 14 and spindle 12 may be made from the same material and forming processes, or differ from each other in one or multiple ways. The differences in material yields of dissimilar materials and forming processes may increase concern for the loosening of the joint during use. A softer material may yield sooner when acted on by a harder material than when two more similar materials are acting against each other. Thus the tapered joint 38 provides additional robustness to moment loading during operation of the vehicle when a harder forged steel spindle 12 is disposed within a softer cast aluminum knuckle 14, than when compared to a non-tapered joint of the same components.

Figure 2:
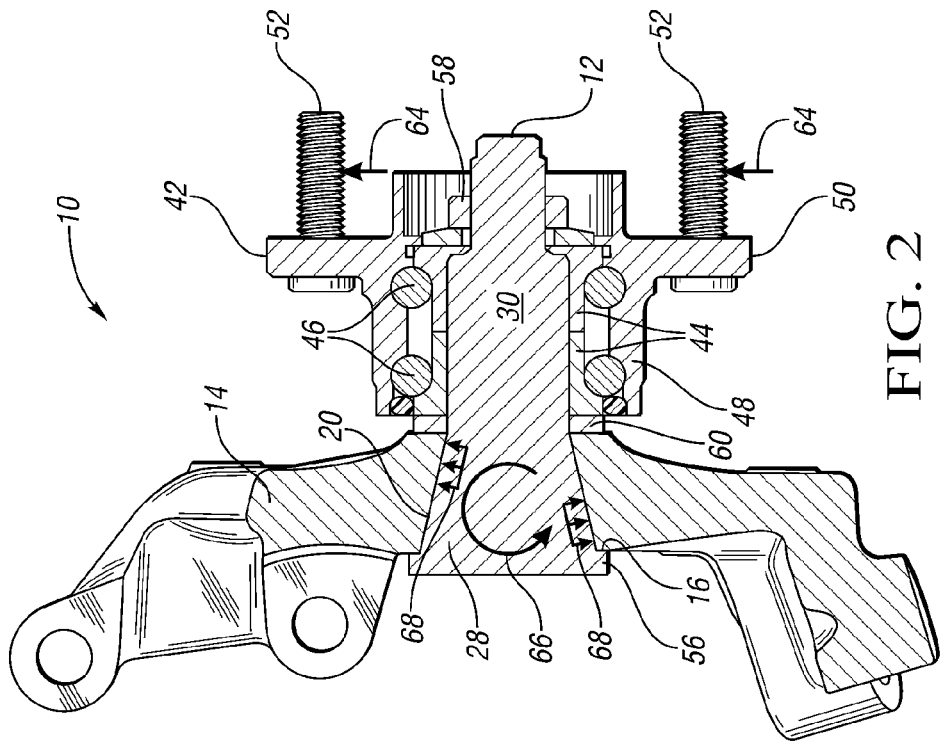
FIG. 2 is a cross-sectional view of a suspension sub-assembly with a hub-and-bearing assembly disposed on a spindle and the spindle having a tapered portion at least partially disposed in a tapered spindle-bore of a knuckle.

FIG. 2 shows an automotive knuckle assembly 10 with a hub-and-bearing assembly 42 disposed on the spindle 12 adjacent the knuckle 14. The hub-and-bearing assembly 42 may have one, or a pair, of inner races 44 disposed on the cantilever portion 30 of the spindle 12 and a set of roller elements 46, shown here as ball bearings, disposed between the inner races 44 and an outer ring 48. The roller elements 46 allow the outer ring 48 to rotate around the inner races 44 and the spindle 12. The outer ring 48 may be integral with a hub 50 supporting wheel studs 52.

In this embodiment, the spindle 12 has a head portion 56 extending from the tapered knuckle-mating portion 28 opposite the cantilever portion 30. The head portion 56 may contact a portion of the inboard side 16 of the knuckle 14. The head portion 56 is designed to have a diameter larger than the largest diameter of the spindle-bore 20.

A retaining nut 58 may be screwed on to the cantilever portion 30 of the spindle 12 outboard of the inner races 44 to retain the hub-and-bearing assembly 42 on the spindle 12. A spacer 60 may be disposed on the spindle between and in contact with the knuckle 14 and the hub-and-bearing assembly 42. The spacer 60 is primarily used to position the hub-and-bearing assembly 42 further outboard from the knuckle 14. The retaining nut 58 may also cooperate with the hub-and-bearing assembly 42, spacer 60, and knuckle 14 to further seat and secure the tapered knuckle-mating portion 28 of the spindle 12 in the spindle-bore 20 of the knuckle 14. The retaining nut 58 may pull the spindle 12 outboard as the retaining nut 58 is tightened down on threads located on the outboard end of the cantilever portion 30 of the spindle 12 drawing the tapered knuckle-mating portion 28 of the spindle tighter into the tapered spindle-bore 20 of the knuckle 14.

A wheel and tire (not shown) may be disposed on the hub 50 of the hub-and-bearing assembly 42. The wheel and tire support the vehicle on the ground, and the weight of the vehicle applies a force on the wheel studs 52, represented by arrows 64. The force 64 on the wheel studs 52 translates to a generally vertical force applied to the cantilever portion 30 of the spindle 12. The force on the cantilever portion 30 imparts a moment, as represented by arrow 66, on the knuckle-mating portion 28 of the spindle 12 within the spindle-bore 20 of the knuckle 14. The taper of the knuckle-mating portion 28 and the spindle-bore 20 help distribute the contact forces, as represented by the arrows 68, between the adjoining surfaces of the spindle 12 and the knuckle 14.

While a vehicle is moving, the suspensions system rises and falls, and the moment 66 may increase and decrease in magnitude. The cyclic nature of the moment causes localized stress fatigue to be focused on the knuckle 14 near the inboard and outboard openings 22, 24. The tapered joint provides the adjoining surfaces in an orientation better suited for receiving the localized stress fatigue, by increasing the area of fatigue localization. Increasing the area of localization reduces the possibility of material yield. The tapered knuckle-mating portion 28 and spindle-bore 20 distribute the contact forces greater than that of a non-tapered spindle disposed within a non-tapered spindle-bore.

Figure 4:
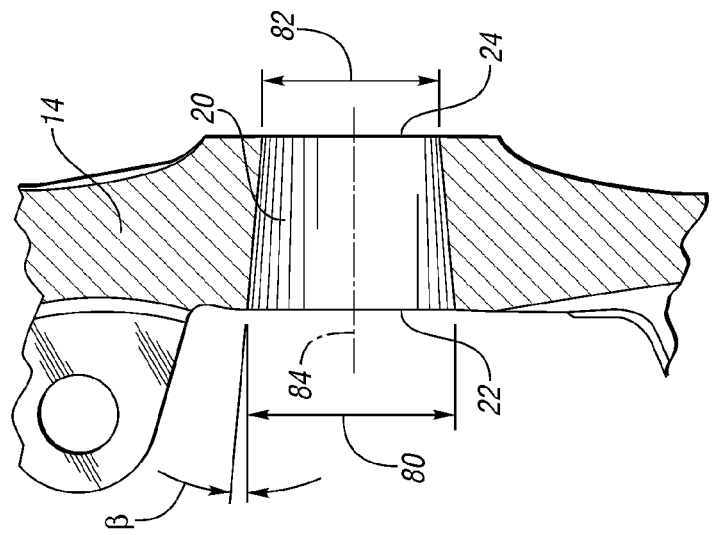
FIG. 4 is a partial cross-sectional view of a tapered spindle-bore.
Figure 3:
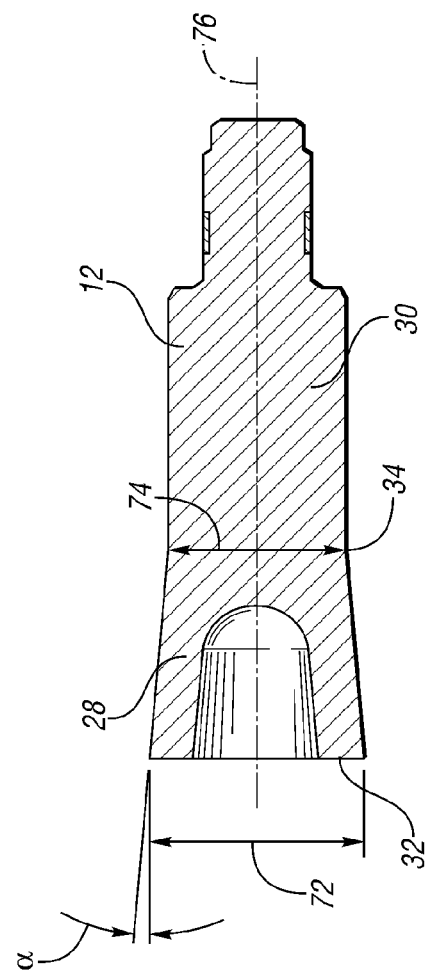
FIG. 3 is a cross-sectional view of a tapered spindle.

FIGS. 3 and 4 show a spindle 12 and a portion of a knuckle 14 defining a corresponding spindle-bore 20, respectively. The spindle 12 has a tapered knuckle-mating portion 28 with an inboard end 32 having a first outer-diameter 72 and an outboard end 34 having a second outer-diameter 74. The spindle 12 has a first central axis 76 and the knuckle-mating portion 28 tapers inwardly from the inboard end 32 to the outboard end 34 at a taper angle $\alpha$ relative to the first central axis 76. Taper angle $\alpha$ may be at least 4 degrees relative to the first central axis 76. The spindle-bore 20 has an inboard opening 22 having a first inner-diameter 80 and an outboard opening 24 having a second inner-diameter 82. The spindle-bore 20 has a second central axis 84 and tapers inwardly from the inboard opening 22 to the outboard opening 24 at a taper angle $\beta$ relative to the first central axis 76. Taper angle $\beta$ may be at least 4 degrees relative to the second central axis 84.

The spindle 12 may be inserted into the spindle-bore 20 such that the first central axis 76 and the second central axis 84 are generally co-axial. The first outer-diameter 72 of the knuckle-mating portion 28 may be larger than the first inner-diameter 80 of the spindle-bore 20, such that the inboard end 32 is not disposed within the spindle-bore 20. The first outer-diameter 72 may be equal to or smaller than the first inner-diameter 80, and disposed within the spindle-bore 20, as long as the first outer-diameter 72 is larger than the second inner-diameter 82 preventing the spindle 12 from passing completely through the spindle-bore 20. The second outer-diameter 74 of the knuckle-mating portion 28 of the spindle 12 may be equal to or smaller than the second inner-diameter 82 of the spindle-bore 20 allowing the outboard end 34 to come to or extend from the spindle-bore 20.

The taper angles $\alpha$, $\beta$ may have substantially the same degree of inclination. The taper angles $\alpha$, $\beta$ of the knuckle-mating portion 28 of the spindle 12 may provide for a nested-fit or press-fit tapered joint 38 (see FIG. 1). The tapered joint 38 may also have a taper relative to a co-axial center line (not shown) greater than or equal to 4 degrees.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A steering-knuckle assembly comprising:
   a steering-knuckle defining a tapered spindle-bore; and
   a spindle having a tapered knuckle-mating portion at least partially disposed within the spindle-bore, wherein at least a portion of the knuckle-mating portion of the spindle is press-fit in the spindle-bore of the steering-knuckle to provide a press-fit tapered joint between the spindle and the steering knuckle.

2. The assembly of claim 1 wherein the spindle-bore has an inboard opening and an outboard opening, and the spindle-bore tapers inwardly from the inboard opening to the outboard opening.

3. The assembly of claim 1 wherein the knuckle-mating portion of the spindle has an inboard end and an outboard end and the knuckle-mating portion tapers inwardly from the inboard end toward the outboard end.

4. The assembly of claim 1 wherein a cantilever end of the spindle extends from the knuckle-mating portion and is capable of receiving a force which imparts a moment on the knuckle-mating portion disposed within the spindle-bore, and the knuckle-mating portion and spindle-bore taper inwardly toward the force on the cantilever end.

5. The assembly of claim 4 wherein the taper distributes a load caused by the moment over adjoining surfaces.

6. The assembly of claim 1 wherein the spindle-bore and at least a portion of the knuckle-mating portion disposed within the spindle-bore provide a tapered joint between the spindle and the steering knuckle.

7. The assembly of claim 6 wherein the spindle-bore defines a central axis and the taper of the joint between the spindle and steering knuckle is greater than or equal to 4 degrees relative to the central axis.

8. The assembly of claim 1 wherein the steering-knuckle defines an inboard opening of the spindle-bore with a first inner-diameter and the knuckle-mating portion of the spindle has an inboard end with a first outer-diameter, wherein the first outer-diameter of the knuckle-mating portion is larger than the first inner-diameter of the spindle-bore.

9. The assembly of claim 8 wherein the steering-knuckle defines an outboard opening of the spindle-bore with a second inner-diameter and the knuckle-mating portion of the spindle has an outboard end with a second outer-diameter, wherein the second inner-diameter of the spindle-bore is equal to or larger than the second outer-diameter of the knuckle-mating portion.

10. The assembly of claim 1 wherein the steering-knuckle is aluminum and the spindle is steel.

11. A suspension sub-assembly for a vehicle comprising:
    a suspension component defining a tapered spindle-bore; and
    a spindle having a tapered portion at least partially disposed within the spindle-bore and a cantilever portion extending from the tapered portion and away from the suspension component, wherein the spindle-bore and the tapered portion of the spindle taper inwardly toward the cantilever portion of the spindle providing a tapered joint between the spindle and the suspension component.

12. The sub-assembly of claim 11 wherein the tapered portion of the spindle corresponds to the tapered spindle-bore to provide a nested fit between the spindle and the suspension component.

13. The sub-assembly of claim 11 wherein the spindle has a head portion extending from the tapered portion opposite of the cantilever portion wherein the head portion has a diameter larger than the spindle-bore.

14. The sub-assembly of claim 11 further comprising a hub-and-bearing assembly and a retaining nut disposed on the cantilever portion of the spindle, wherein the hub-and-bearing assembly is adjacent the suspension component and the retaining nut is used to retain the hub-and-bearing assembly on the spindle.

15. The sub-assembly of claim 14 further comprising a spacer disposed on the spindle between and in contact with the suspension component and the hub-and-bearing assembly, and the retaining nut cooperates with the hub-and-bearing assembly, spacer, and suspension component to secure the tapered portion of the spindle in the spindle-bore.

16. The sub-assembly of claim 11 wherein spindle-bore defines a central axis and the taper of the spindle-bore is greater than or equal to 4 degrees relative the central axis.

17. An automotive knuckle assembly comprising:
   a knuckle defining a spindle-bore therethough; and
   a spindle having a knuckle-mating portion tapering inwardly from an inboard end to an outboard end, wherein the knuckle-mating portion is partially disposed in the spindle-bore.

18. The assembly of claim 17 wherein the spindle-bore has an inboard opening with a first inner-diameter and an outboard opening with a second inner-diameter, the spindle-bore tapering inwardly from the inboard opening to the outboard opening, and the knuckle-mating portion has an inboard end with a first outer-diameter and an outboard end with a second outer-diameter, the knuckle-mating portion tapering inwardly from the inboard end to the outboard end, wherein the first outer-diameter of the spindle is larger than the second inner-diameter of the spindle-bore, such that the knuckle-mating portion of the spindle may be press-fit into the spindle-bore without passing through the knuckle.

\* \* \* \* \*